United States Patent
Woods et al.

(10) Patent No.: US 7,334,037 B2
(45) Date of Patent: *Feb. 19, 2008

(54) SYSTEMS AND METHODS FOR SITE ACCESS

(75) Inventors: Jonathan Woods, Minneapolis, MN (US); Ed Wynne, Plymouth, MN (US)

(73) Assignee: NetSelector, Inc., Minneapolis, MN (US)

( * ) Notice: Subject to any disclaimer, the term of this patent is extended or adjusted under 35 U.S.C. 154(b) by 307 days.

This patent is subject to a terminal disclaimer.

(21) Appl. No.: 10/099,196

(22) Filed: Mar. 13, 2002

(65) Prior Publication Data

US 2002/0087692 A1 Jul. 4, 2002

Related U.S. Application Data

(63) Continuation of application No. 08/982,240, filed on Dec. 1, 1997, now Pat. No. 6,446,128.

(51) Int. Cl.
*G06F 15/173* (2006.01)
*G06F 12/14* (2006.01)

(52) U.S. Cl. ............. 709/225; 709/229; 726/26

(58) Field of Classification Search ............. 709/229, 709/225, 219; 706/47; 380/49; 715/501.1
See application file for complete search history.

(56) References Cited

U.S. PATENT DOCUMENTS

| | | | |
|---|---|---|---|
| 5,473,772 A | | 12/1995 | Halliwell et al. |
| 5,544,322 A | | 8/1996 | Cheng et al. |
| 5,586,260 A | * | 12/1996 | Hu .............................. 713/201 |
| 5,657,390 A | | 8/1997 | Elgamal et al. |
| 5,706,507 A | * | 1/1998 | Schloss ................. 707/104.1 |
| 5,757,925 A | | 5/1998 | Faybishenko |
| 5,784,564 A | * | 7/1998 | Camaisa et al. ............. 709/224 |
| 5,784,566 A | | 7/1998 | Viavant et al. |
| 5,815,665 A | | 9/1998 | Teper et al. |
| 5,825,890 A | | 10/1998 | Elgalmal et al. |
| 5,835,722 A | * | 11/1998 | Bradshaw et al. .......... 709/225 |
| 5,884,033 A | * | 3/1999 | Duvall et al. ............... 709/225 |
| 5,889,958 A | * | 3/1999 | Willens ....................... 709/229 |
| 5,935,207 A | | 8/1999 | Logue et al. |
| 5,950,195 A | * | 9/1999 | Stockwell et al. .............. 707/4 |
| 5,961,645 A | * | 10/1999 | Baker ............................ 726/1 |
| 5,983,350 A | * | 11/1999 | Minear et al. .............. 713/201 |

(Continued)

OTHER PUBLICATIONS

James E. Pitkow et al., Supporting The Web: A Distributed Hyperlink Database System, Fifth International World Wide Web Conference, May 1996, 10 pages.*

*Primary Examiner*—Patrice Winder
(74) *Attorney, Agent, or Firm*—Schwegman, Lundberg & Woessner, P.A.; Michael Lynch (57) ABSTRACT

Monitoring site access via an intervening control layer within a client is disclosed. In one embodiment of the invention, a computerized system includes a plurality of sites, a monitoring server, and a client. Each site has content referenced be addresses. The monitoring server maintains a database of permissible content on at least one of the plurality of sites, where the permissible content is also referenced by addresses. The client has an intervening control layer within an otherwise standard mechanism by which programs running on the client access the content on the plurality of sites. The intervening control layer polls the monitoring server to determine whether a program attempting to access content on one of the sites as referenced by an address should be permitted to do so.

11 Claims, 4 Drawing Sheets

U.S. PATENT DOCUMENTS

| | | | | |
|---|---|---|---|---|
| 5,996,011 A | * | 11/1999 | Humes | 709/225 |
| 6,049,821 A | * | 4/2000 | Theriault et al. | 709/203 |
| 6,055,543 A | | 4/2000 | Christensen et al. | |
| 6,085,223 A | | 7/2000 | Carino, Jr. et al. | |
| 6,211,871 B1 | * | 4/2001 | Himmel et al. | 345/744 |
| 6,308,173 B1 | * | 10/2001 | Glasser et al. | 707/9 |
| 6,360,205 B1 | | 3/2002 | Iyengar et al. | 705/5 |
| 6,434,607 B1 | * | 8/2002 | Haverstock et al. | 709/217 |
| 6,446,128 B1 | * | 9/2002 | Woods et al. | 709/229 |
| 6,466,570 B1 | | 10/2002 | Low et al. | 370/352 |
| 6,618,833 B1 | | 9/2003 | Hill et al. | 716/1 |
| 6,629,097 B1 | | 9/2003 | Keith | 707/5 |
| 6,662,232 B1 | | 12/2003 | Nicholls et al. | 709/246 |

* cited by examiner

SYSTEMS AND METHODS FOR SITE ACCESS

CROSS-REFERENCE TO RELATED APPLICATION

This is a continuation under 37 C.F.R. 1.53(b) of U.S. patent application Ser. No. 08/982,240, filed Dec. 1, 1997, now U.S. Pat. No. 6,446,128 which application is incorporated herein by reference.

FIELD OF THE INVENTION

This invention relates generally to monitoring access by a client to a plurality of sites, and more particularly to such monitoring via an intervening control layer within the client.

BACKGROUND OF THE INVENTION

With the advent of the Internet, monitoring access to world-wide web sites has reached paramount importance. For example, a school or parent may desire that children only be able to access a limited number of sites that are known not to contain material believed not suitable for children. As another example, an employer may only want its employees to access information from sites that are believed to be relevant to the employees' jobs, and not the entire Internet.

Prior art solutions aimed at monitoring access to world-wide web sites are not fool proof, however. One approach is to incorporate within the program by which Internet access is accomplished safeguards to prevent access to unauthorized sites. For example, versions of Netscape Navigator or Microsoft Internet Explorer may be modified such that Internet access is monitored (viz., access to certain site prohibited). However, this approach is easily circumvented by merely installing an unadulterated version of Netscape Navigator or Microsoft Internet on the computer.

Another approach is to limit access to objectionable sites on the Internet at the Internet Service Provider (ISP) level. To connect to the Internet, a user must have an account with an ISP, through which the user accesses content on the Internet. The ISP thus can limit the content to which the user has access. This approach is also easily circumvented, however. The user may merely connect to the Internet using an account with a different ISP, which allows complete access to the entire Internet, including objectionable content.

Therefore, there is a need for better monitoring of Internet access that is not as easily circumvented as solutions found in the prior art are.

SUMMARY OF THE INVENTION

The above-identified shortcomings as well as other shortcomings and problems are addressed by the present invention, which will be understood by reading and studying the following specification. In one embodiment, a computerized system includes a plurality of sites, a monitoring server, and a client. Each site has content referenced be addresses. The monitoring server maintains a database of permissible content on at least one of the plurality of sites, where the permissible content is also referenced by addresses. The client has an intervening control layer within an otherwise standard mechanism by which programs running on the client access the content on the plurality of sites. The intervening control layer polls the monitoring server to determine whether a program attempting to access content on one of the sites as referenced by an address should be permitted to do so.

More specifically, in one particular embodiment of the invention, the plurality of sites are Internet world-wide-web sites, and the monitoring server and the client are also communicatively coupled via the Internet. In this particular embodiment, content is referenced via a Universal Resource Locator (URL), and the otherwise standard mechanism of the client includes a socket services program and a TCP/IP handler program, such that the intervening control layer resides between the two. Thus, any sort of program accessing the Internet must go through the socket services program and the TCP/IP handler program, and also the intervening control layer.

The invention thus provides for advantages not found in the prior art. With respect to the specific embodiment described above, monitoring access to the Internet is not contingent on the browser program being run on the client. Any browser program—Microsoft Internet Explorer, Netscape Navigator, or a different browser program—must go through the socket services program (e.g., WinSock), and the TCP/IP handler program (e.g., the TCP/IP stack), such that the intervening control layer may intercept URL addresses, and via a call to the monitoring server, determine whether they access should be permitted thereto.

Furthermore, also with respect to the specific embodiment described above, monitoring access to the Internet is also not contingent on the Internet Service Provider (ISP) through which the Internet is accessed. Regardless of the ISP used, access at the client must go through the socket services program, the TCP/IP handler program, and thus the intervening control layer, so that URL address may be intercepted, and via a call to the monitoring server, deemed to be permissible or not.

In different embodiments of the invention, computerized methods, computerized systems, computers, servers and computer-readable media of varying scope are described. Still other and further embodiments, aspects and advantages of the invention will become apparent by reference to the drawings and by reading the following detailed description.

BRIEF DESCRIPTION OF THE DRAWINGS

FIG. 2(*a*) is a diagram of a computerized system in accordance with one embodiment of the invention;

FIG. 2(*b*) is a diagram of a computerized system in accordance with another embodiment of the invention; and, FIG. 3 is a diagram of a computerized method in accordance with one embodiment of the invention.

DETAILED DESCRIPTION OF THE INVENTION

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the appended claims.

Figure 1:
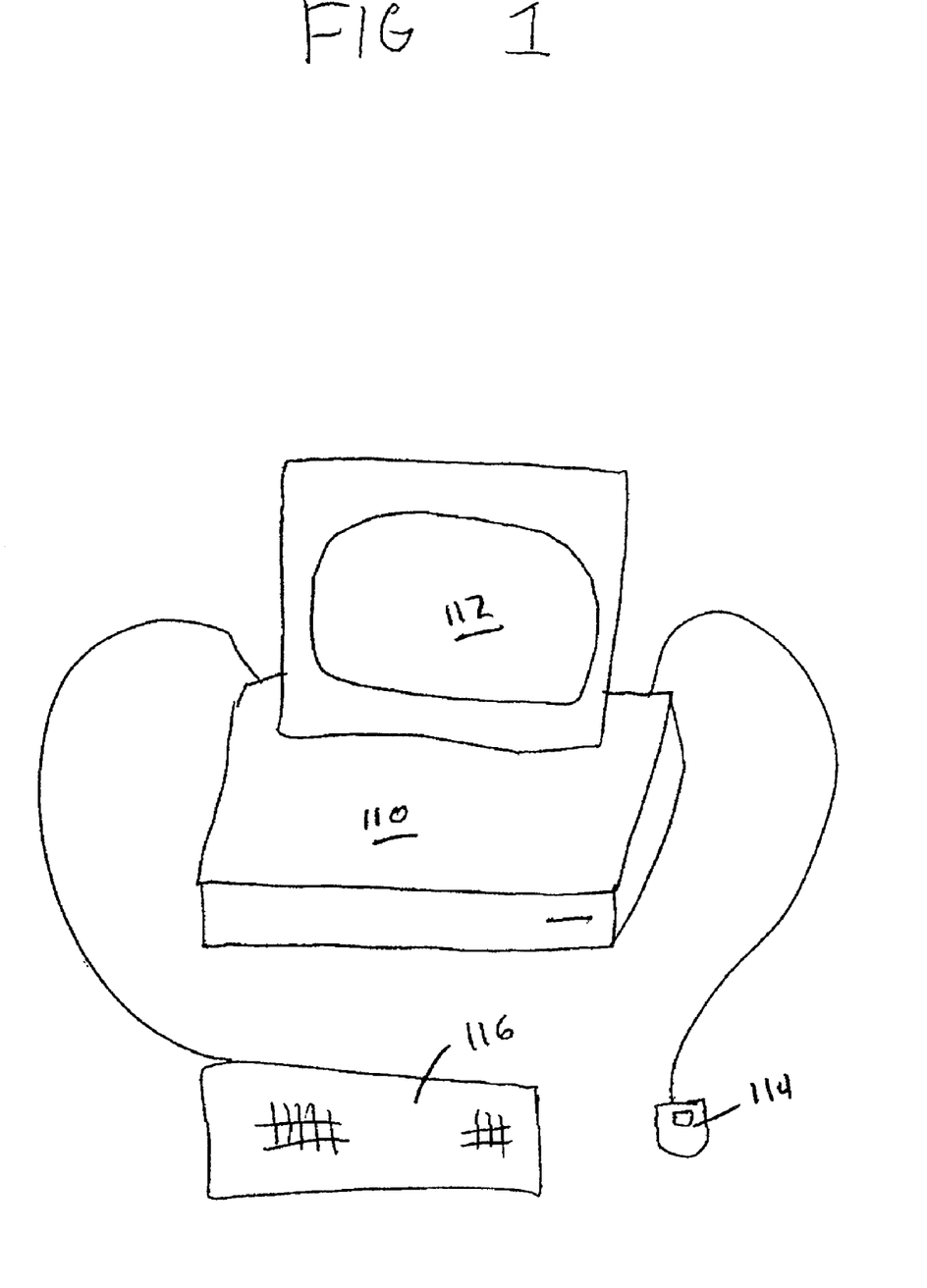
FIG. 1 is a diagram of a computer in conjunction with which embodiments of the invention may be implemented.

Referring first to FIG. 1, a diagram of a computer in conjunction with which embodiments of the invention may be implemented is shown. Computer 110 is operatively coupled to display device 112, pointing device 114, and keyboard 116. Computer 110 includes a processor (preferably, an Intel Pentium processor), random-access memory (RAM) (preferably, at least thirty-two megabytes), read-only memory (ROM), and one or more storage devices, such as a hard disk drive, a floppy disk drive (into which a floppy disk can be inserted), an optical disk drive, and a tape cartridge drive. The memory, hard drives, floppy disks, etc., are types of computer-readable media. The hard drives and floppy disks are also types of non-volatile storage media. The invention is not particularly limited to any type of computer 110. Computer 110 preferably is a PC-compatible computer or a MacOS-compatible computer. The construction and operation of such computers are well known within the art.

Furthermore, computer 110 may be communicatively connected to the Internet via a communication device, any particular manner by which the invention is not limited to, and which is not shown in FIG. 1. Internet connectivity is well known within the art. In one embodiment, the computer includes a communication device that is a modem and corresponding communication drivers to connect to the Internet via what is known in the art as a "dial-up connection." In another embodiment, the computer includes a communication device that is an Ethernet or similar hardware (network) card to connect to a local-area network (LAN) that itself is connected to the Internet via what is know in the art as a "direct connection" (e.g., T1 line, etc.).

Computer 110 also has at least one operating environment running thereon, each desirably providing a graphical user interface including a user-controllable pointer. Such operating environments include operating systems such as versions of the Microsoft Windows and Apple MacOS operating systems known in the art. The invention is not limited to any particular operating environment, however, and the construction and use of such operating environments are well known within the art. Computer 110 also desirably has at least one web browser application program running within the at least one operating environment, to permit users of computer 110 to access Internet world-wide-web pages as addressed by Universal Resource Locator (URL) addresses. Such browser application programs include Netscape Navigator and Microsoft Internet Explorer. It is noted, however, that the invention is amenable for implementation on any type of computer—e.g., a computer running Microsoft Windows, a computer running Apple MacOS, etc. The embodiments described herein largely pertain to a computer running Microsoft Windows; this should not be taken as a limitation as to the invention only pertaining to Microsoft Windows. For example, where WinSock is specific to Microsoft Windows, Open Transport would be the corresponding mechanism utilized in Apple MacOS.

Display device 112 permits the display of information, including computer, video and other information, for viewing by a user of the computer. The invention is not limited to any particular display device 112. Such display devices include cathode ray tube (CRT) displays (monitors), as well as flat panel displays such as liquid crystal displays (LCD's). Pointing device 114 permits the control of the screen pointer provided by the graphical user interface of operating systems such as versions of Microsoft Windows. The invention is not limited to any particular pointing device 114. Such pointing devices include mouses, touch pads, trackballs, remote controls and point sticks. Finally, keyboard 116 permits entry of textual information into computer 110, as known within the art, and the invention is not limited to any particular type of keyboard.

Figure 2A:
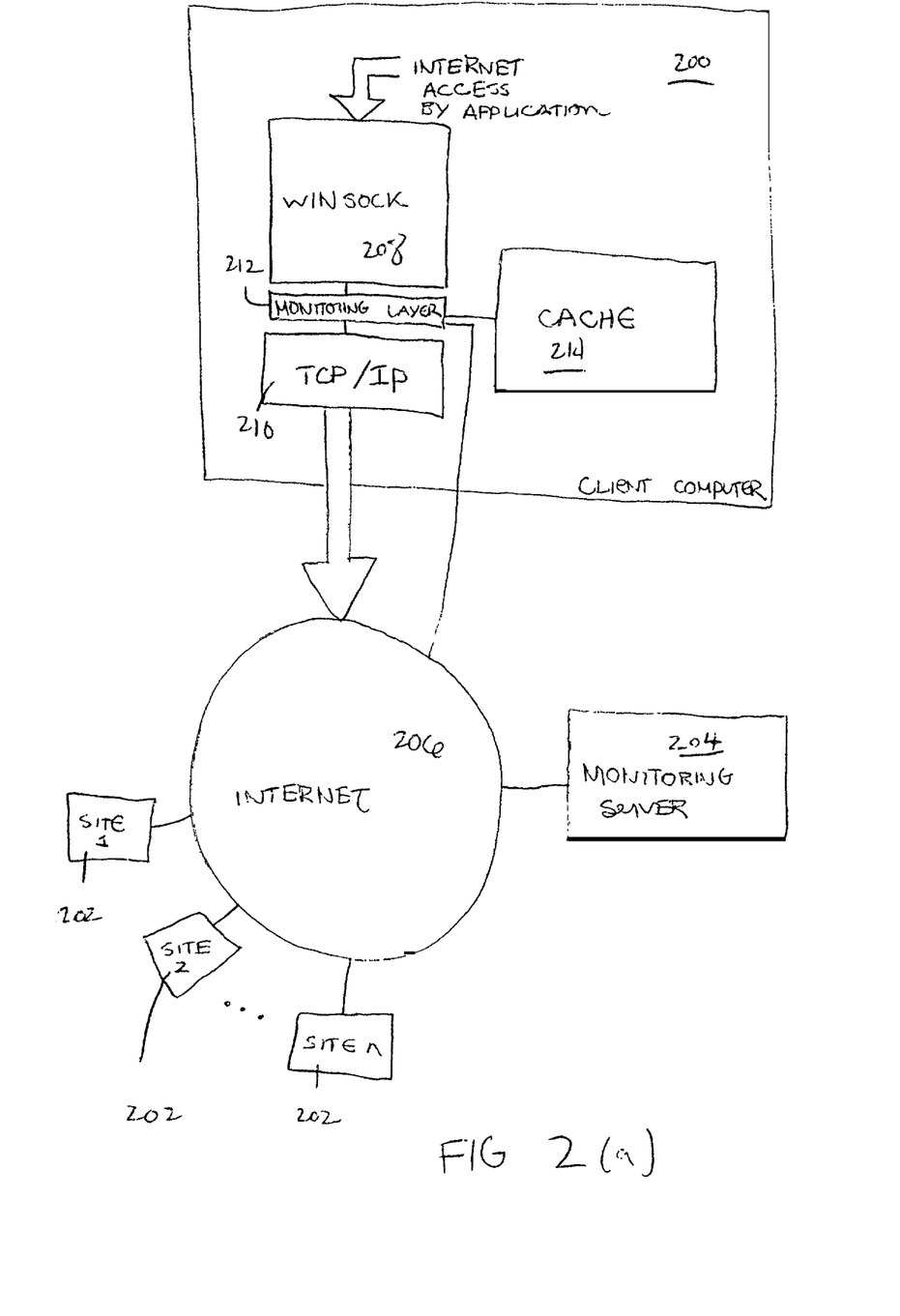

Referring next to FIG. 2(a), a diagram of a computerized system in accordance with one embodiment of the invention is shown. Client computer 200 is able to access sites 202 as permitted by monitoring server 204. Each of client computer 200, sites 202, and monitoring server 204 is communicatively coupled to one another via the Internet 206. Furthermore, each of client computer 200 and monitoring server 204 may be a computer such as that shown in and described in conjunction with FIG. 1, although the invention is not so limited. Thus, each of client computer 200, and monitoring server 204 has a processor, a computer-readable medium from which computer programs are executed by the processor, and desirably a communications device, such as a network card, or a modem. The communications device provides an Internet connection for the computer.

Monitoring server 204 and each of sites 202 desirably is or includes an Internet world-wide-web server, as known in the art, such that it has assigned thereto a Universal Resource Locator (URL) address to permit client computer 200, as well as other computers, to access the web server. The invention is not particularly limited to a given type of web server. Typical examples include those running software available from Netscape, Microsoft, Apache, NCSA, and others. Each web server is also not limited to running on a particular operating system (OS); common operating systems including Microsoft Windows 95, Microsoft Windows NT, Apple MacOS and UNIX. Furthermore, each of sites 202 includes content referenced by URL addresses, such as multimedia content, web pages, images that are part of web pages, etc. More specifically, the content as referenced by URL address includes a plurality of hypertextmarkup-language (HTML) pages located at a site; the content may be in a particular directory on a storage device located at the site, or in one or more directories within the storage device.

Client 200 includes a standard mechanism by which programs running on the client access the sites 202 through the Internet. The standard mechanism as shown in FIG. 2(a) includes a socket services program 208, such as WinSock, and a TCP/IP handler program 210, that provides a TCP/IP stack. Thus, when a computer program running on client 200 attempts to access a site 202 via a URL address, it passes this information to socket services program 208, which passes the request to TCP/IP program 210, which then accesses the site through the Internet as known within the art.

However, the invention adds an intervening control layer 212 between the socket services program 208 and the TCP/IP program 210. Intervening control layer 212 monitors information passed between socket services program 208 and TCP/IP program 210; when a URL address passes through, layer 212 intercepts the URL address to determine whether content at the address is permissible to be accessed. Layer 212 accomplishes this in a two-fold manner. First, layer 212 checks cache 214 to determine whether the address is listed therein. Cache 214 is a cache of addresses that were previously determined to refer to permissible content. If the address is not in cache 214, layer 212 polls monitoring server 204, asking monitoring server 204 if the content at the requested URL address is permissible. Layer 212 is desirably software (e.g., a computer program) running on client computer 200. Note that layer 212 desirably does not make direct calls to TCP/IP program 210.

Server 204 maintains a database of permissible content (referenced by URL addresses), such as a SQL database of such content. When it receives a request from client 200 as to whether content at a given URL address is permitted to be accessed, server 204 determines whether the address is in the database, indicating that the content at this address is permissible. Server 204 desirably accomplishes this by running a computer program having this functionality. If the content is deemed permissible, layer 212 permits the requested URL address to pass through to TCP/IP program 210, and further adds the address to cache 214, so that subsequent permission to programs running on the client to access the content at this URL address can be given without repeated polling of server 204. If the address is not in the database, layer 212 does not permit the requested URL address to pass through to TCP/IP program 210, effectively denying access to the content at this URL address by the requesting program running on client 200.

The manner by which the database is maintained by the server is not limited under the invention. The database may be maintained by a separate database server that is a part of monitoring server 204 (where monitoring server 204 also includes a web server). Furthermore, in one embodiment, permissible content is divided into two types: type 1 and type 2. Type 1 permissible content is any file at a given URL address. For example, if a permitted URL address is "http://www.permissible.com," any file within any subdirectory at this URL address is permitted—"http://www.permissible.com/file.htm, http://www.permissible.com/directory1/directory2/file3.htm," etc. Type 2 permissible content is any file within any subdirectory within a given directory or subdirectory at a given URL address. For example, if a permitted directory at a URL address is "http://www.permissible.com/permissible," any file within any subdirectory within the directory "permissible" would be permissible. That is, "http://www.permissible.com/permissible/file.htm," and "http://www.permissible.com/permissible/directory/file2.htm" would be permissible, but "http://www.permissible.com/notpermissible/file5.htm" would not be.

Furthermore, type 2 permissible content includes image files, as denoted by .JPG or .GIF suffixes, so long as they reside at the same URL address, regardless of which directory or subdirectory within the URL address they reside. This exception is made because frequently all images at a web site are stored at a location separate from the web pages using those images. Inasmuch as the web pages using those images have been deemed to be permissible, it is assumed that those images are permissible as well. Thus, the database maintained by the server includes permissible content, such that at least some of the content includes all HTML pages located at a web site (type 1), or an incomplete portion of all the HTML pages located at the site (type 2).

Figure 2B:
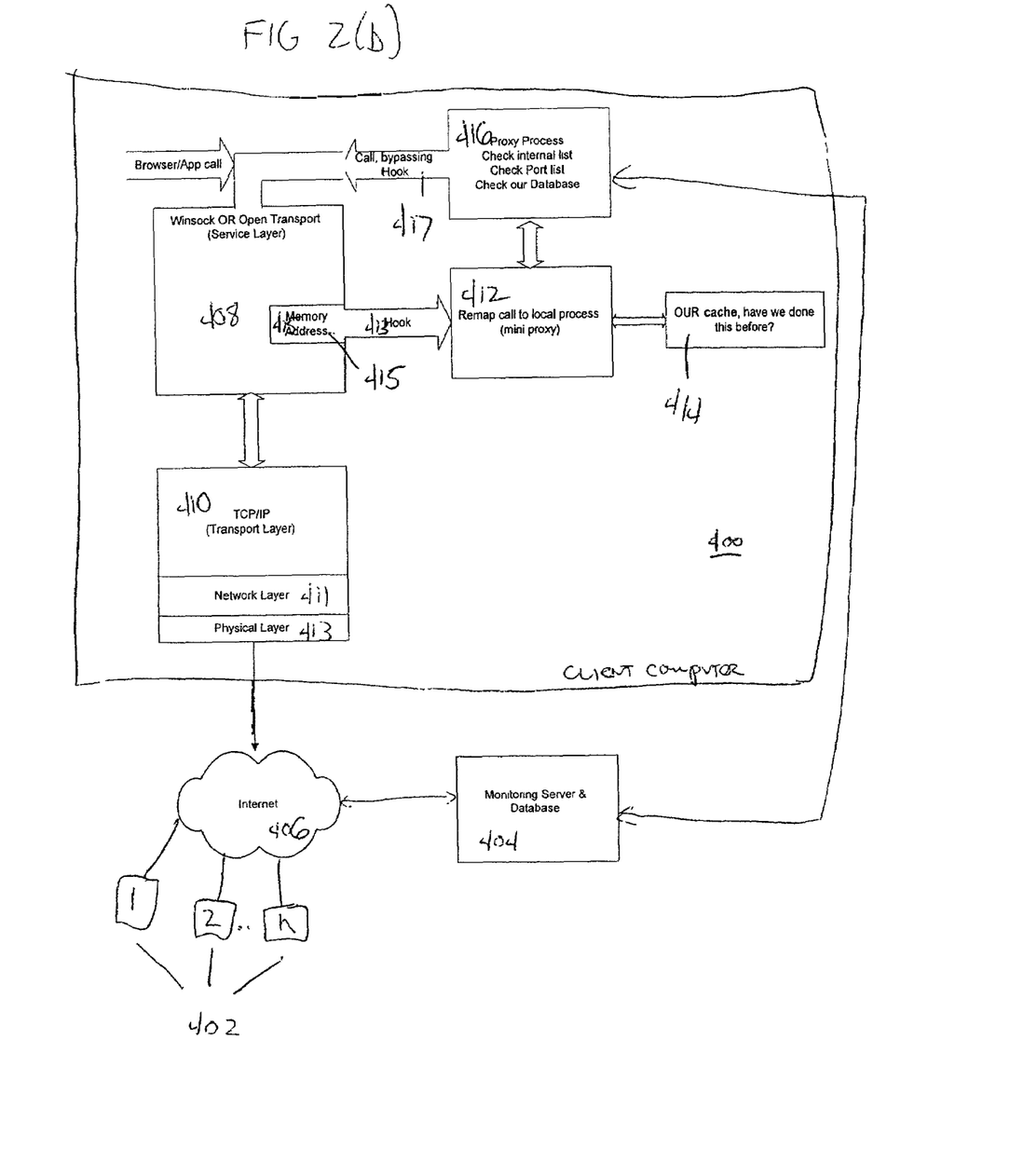

Referring next to FIG. 2(*b*), a diagram of a computerized system in accordance with another embodiment of the invention is shown. Client computer 400 is able to access sites 402 as permitted by monitoring server 404. Each of client computer 400, sites 402, and monitoring server 404 is communicatively coupled to one another via the Internet 406. Furthermore, each of client computer 400 and monitoring server 404 may be a computer such as that shown in and described in conjunction with FIG. 1, although the invention is not so limited. Thus, each of client computer 400, and monitoring server 404 has a processor, a computer-readable medium from which computer programs are executed by the processor, and desirably a communications device, such as a network card, or a modem. The communications device provides an Internet connection for the computer.

Monitoring server 404 and each of sites 402 desirably is or includes an Internet world-wide-web server, as known in the art, such that it has assigned thereto a Universal Resource Locator (URL) address to permit client computer 400, as well as other computers, to access the web server. The invention is not particularly limited to a given type of web server. Typical examples include those running software available from Netscape, Microsoft, Apple, Apache, NCSA, and others. Each web server is also not limited to running on a particular operating system (OS); common operating systems including Microsoft Windows 95, Microsoft Windows NT, Apple MacOS and UNIX. Furthermore, each of sites 402 includes content referenced by URL addresses, such as multimedia content, web pages, images that are part of web pages, etc. More specifically, the content as referenced by URL address includes a plurality of hypertext-markup-language (HTML) pages located at a site; the content may be in a particular directory on a storage device located at the site, or in one or more directories within the storage device.

Client 400 includes a standard mechanism by which programs running on the client access the sites 402 through the Internet. The standard mechanism as shown in FIG. 2(*a*) includes a socket services program 408, such as WinSock or Open Transport, that provides a service layer, and a TCP/IP handler program 410, that provides a TCP/IP transport layer. Thus, when a computer program running on client 400 attempts to access a site 402 via a URL address, it passes this information to socket services program 408, which passes the request to TCP/IP program 410, which then accesses the site through the Internet as known within the art (i.e., through network layer 411 and physical layer 413, as known within the art). The network layer 411, the transport layer provided by the TCP/IP program 410, and the service layer provided by the program 408 (e.g., WinSock or Open Transport) are all known parts of the Open Systems Interconnection (OSI) model known to those of ordinary skill in the art.

However, the invention adds an intervening control layer 412 between the socket services program 408 and the TCP/IP program 410, via a hook 413 within a memory address 415 of program 408. Intervening control layer 412 monitors information passed between socket services program 408 and TCP/IP program 410; when a URL address passes through, layer 412 intercepts the URL address to determine whether content at the address is permissible to be accessed. Layer 412 accomplishes this in a two-fold manner. First, layer 412 checks cache 414 to determine whether the address is listed therein. Cache 414 is a cache of addresses that were previously determined to refer to permissible content. If the address is not in cache 414, layer 412 polls monitoring server 404, asking monitoring server 404 if the content at the requested URL address is permissible, as represented by block 416. Layer 412 is desirably software (e.g., a computer program) running on client computer 400. Note that layer 412 desirably does not make direct calls to TCP/IP program 410.

Server 404 maintains a database of permissible content (referenced by URL addresses), such as a SQL database of such content. When it receives a request from client 400 as to whether content at a given URL address is permitted to be accessed, server 404 determines whether the address is in the database, indicating that the content at this address is permissible. Server 404 desirably accomplishes this by running a computer program having this functionality. If the content is deemed permissible, layer 412 permits the requested URL address to pass through to TCP/IP program 410—i.e., as represented by call 417, such that hook 413 is bypassed—and further adds the address to cache 414, so that subsequent permission to programs running on the client to access the content at this URL address can be given without repeated polling of server 404. If the address is not in the database, layer 412 does not permit the requested URL address to pass through to TCP/IP program 410, effectively denying access to the content at this URL address by the requesting program running on client 400.

The manner by which the database is maintained by the server is not limited under the invention. The database may be maintained by a separate database server that is a part of monitoring server 404 (where monitoring server 404 also includes a web server). Furthermore, in one embodiment, permissible content is divided into two types: type 1 and type 2. Type 1 permissible content is any file at a given URL address. For example, if a permitted URL address is "http://www.permissible.com," any file within any subdirectory at this URL address is permitted—"http://www.permissible.com/file.htm, http://www.permissible.com/directory1/directory2/file3.htm," etc. Type 2 permissible content is any file within any subdirectory within a given directory or subdirectory at a given URL address. For example, if a permitted directory at a URL address is "http://www.permissible.com/permissible," any file within any subdirectory within the directory "permissible" would be permissible. That is, "http://www.permissible.com/permissible/file.htm," and "http://www.permissible.com/permissible/directory/file2.htm" would be permissible, but "http://www.permissible.com/notpermissible/file5.htm" would not be.

Furthermore, type 2 permissible content includes image files, as denoted by .JPG or .GIF suffixes, so long as they reside at the same URL address, regardless of which directory or subdirectory within the URL address they reside. This exception is made because frequently all images at a web site are stored at a location separate from the web pages using those images. Inasmuch as the web pages using those images have been deemed to be permissible, it is assumed that those images are permissible as well. Thus, the database maintained by the server includes permissible content, such that at least some of the content includes all HTML pages located at a web site (type 1), or an incomplete portion of all the HTML pages located at the site (type 2).

The computerized system according to one embodiment of the invention shown in FIG. 2(b) may be also described in another manner, via a min-proxy server conceptualization. In the embodiment of FIG. 2(b), hooking, as known in the art, into memory address 415 of the service layer provided by program 408 (as represented by arrow 413) is accomplished. When an application makes a call to the service layer i.e., for specific content at a given site as referenced by an address—this call is then remapped to the intervening control layer 412. The call is then processed. First, cache 414 is checked, and desirably includes configuration information. If the call is not within the cache, then the an internal process is called, as represented by block 416. This internal process calls the service layer provided by program 408 itself, except that it bypasses the hook and goes to the monitoring server 404. The server performs the check, returning the results to the service layer, which returns it to the process as represented by block 416. The process then decides whether to allow the original call (more specifically, making the original call), or return it as "access denied". If it makes the original call, it remaps the call to the original and bypasses the hook.

Desirably, embodiments of the invention do not depend on URL address only. That is, the embodiments of the invention check the actual IP (Internet Protocol) address that is being called, and not the URL address. This assists in the invention catching circumvention attempts that use a HOSTS file that remaps any URL address to an IP address, as is known in the art. This is an advantage of the invention. Thus, as used generally herein, the term address may correspond to IP address and/or URL address. (E.g., the phrase "each site having content referenced by addresses" includes either IP addresses and/or URL addresses.)

Figure 3:
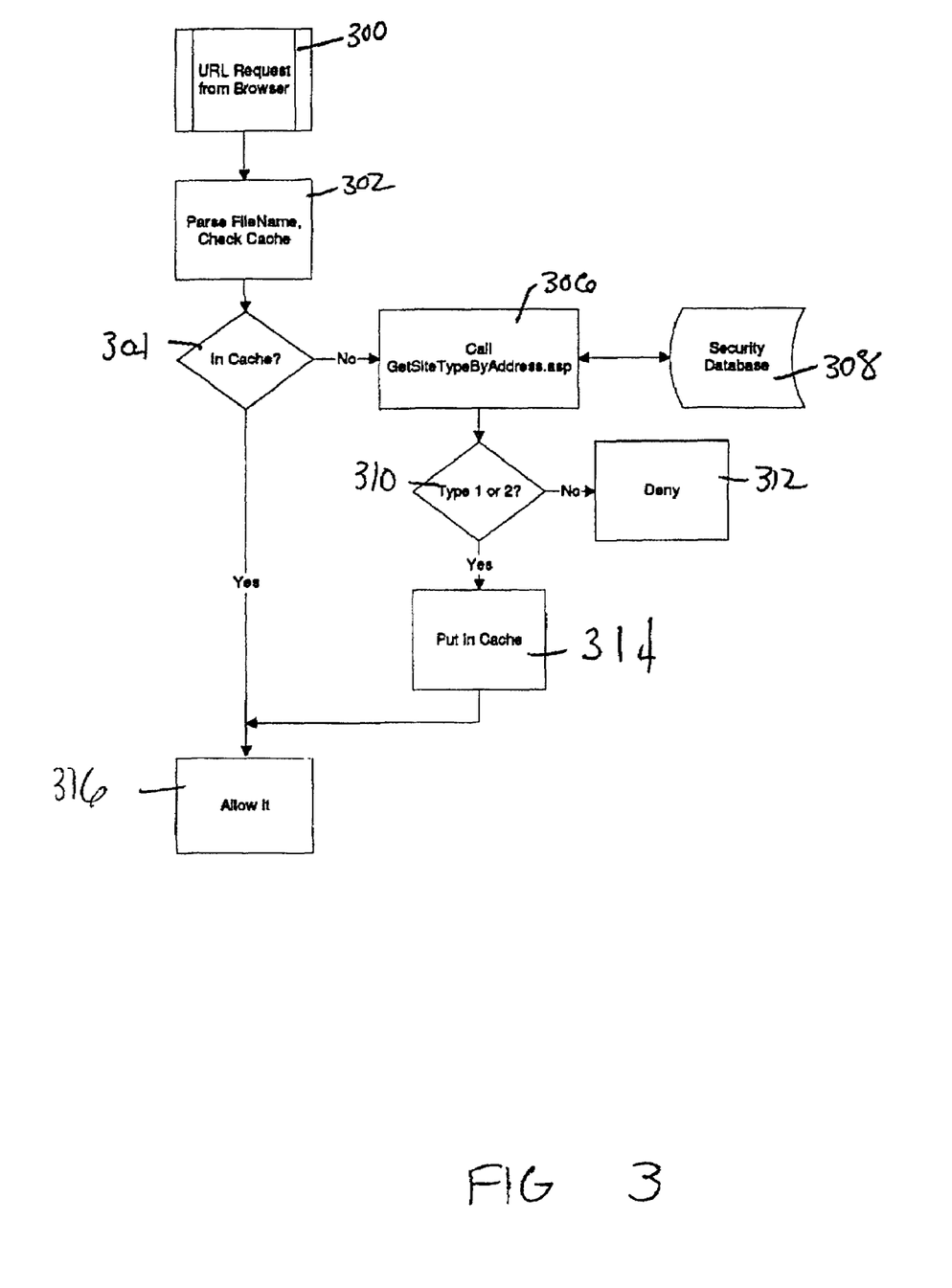

Referring next to FIG. 3, a flowchart of a computerized method according to an embodiment of the invention is shown. This method is inclusive of the steps or acts required to be taken by a client computer and a server computer to monitor Internet access by programs running on the client computer, in accordance with one embodiment of the invention. These steps or acts are performed in accordance with one or more computer programs, such as the intervening control layer and the server program that accesses the database stored on the server, as have been described in conjunction with FIG. 2(a) and FIG. 2(b). The embodiment of the invention described in conjunction with FIG. 3 refers to the situation where the client, the server and a plurality of sites are communicatively coupled to one another through the Internet, where the client is running a web browser program, the server is or includes a web server, and the sites are Internet world-wide-web sites maintained by web servers; however, the invention is not so limited.

In step 300, a web browser or other program running on the client requests content at a server, as referenced by a URL address. In step 302, this URL request is received at a standard mechanism on the client by which programs running on the client access content on the plurality of sites. Such a standard mechanism may include a socket services program and a TCP/IP handler program, as has been described. Further in step 302, the URL request is intercepted by an intervening layer within the standard mechanism. The intervening layer then checks a cache to determine whether the URL address is listed therein.

If the URL address is not in the cache, control proceeds from step 304 to step 306. In step 306, the intervening control layer contacts the monitoring server. The monitoring server in step 306 contacts database 308, to determine whether the URL address (viz., content addressed thereby) is in the database. If the content is not type 1 or type 2 permissible content, as has been previously described, then control proceeds from step 310 to step 312, and the method ends with the intervening control layer denying the web browser or other program access to the content at this URL in step 312. However, if the content is type 1 or type 2 permissible content, then control proceeds instead to step 314, at which step the intervening control layer places the URL address in the cache.

Finally, if in step 304 the requested URL address has been found in the cache, or after step 314, once a permitted URL address (viz., content addressed thereby) has been placed in the cache, then control proceeds to step 316. In step 316, the intervening control layer of the client permits the program running on the client that had accessed the URL address deemed to be permissible to access the content at this URL address.

Site access via an intervening control layer has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. For example, the invention is fully intended to cover databases as well as dynamic directories, such that the term directory may be interpreted to encompass any database amenable to the invention in such an embodiment of the invention. Therefore, it is manifestly intended that this invention be limited only by the following claims and equivalents thereof.

We claim:

1. A method of controlling access to web sites, the method comprising the acts of:
    using an intervening control layer to intercept a network address being passed to a transport layer process from a socket services process;
    determining if the intercepted network address is indicated in a local cache of permissible content;
    permitting the intercepted network address to be passed to the transport layer process if the network address is indicated in the local cache of permissible content;
    if the local cache of permissible content does not indicate the intercepted network address,
        contacting a monitoring server to determine if access to the intercepted network address is permissible,
        if indicated as permitted by the monitoring server, permitting the intercepted network address to pass to the transport layer process and updating the local cache to indicate the intercepted network address, and
        blocking the intercepted network address from passing to the transport layer process if indicated as blocked by the monitoring server.

2. The method of claim 1, wherein the monitoring server maintains a database of permissible content.

3. The method of claim 1, wherein the act of using the intervening control layer comprises the act of invoking a hook in the socket services process that calls the intervening control layer.

4. The method of claim 1, wherein the act of contacting the monitoring server comprises the act of invoking a process internal to the intervening control layer to call the socket services process and bypass the hook.

5. The method of claim 1 further comprising the act of permitting access to the network address, if the network address is permitted to pass to the transport layer process, in accordance with indication of the network address as hosting a first type of permissible content or as a second type of permissible content, wherein access is limited to a given directory or subdirectory for the second type of permissible content.

6. One or more computer-readable media having code stored therein for execution by one or more processors, the code comprising:
    a socket services code executable to receive a network address from an application and to pass the network address to a transport layer process; and
    an intervening control layer code executable to,
        intercept a network address to be passed by the socket services code to a transport layer process,
        check a cache of addresses and to permit the intercepted network address to pass to the transport layer process if indicated in the cache and to block the intercepted network address from being passed to the transport layer process if not indicated in the cache,
        ask a monitoring server if content at the intercepted network address is permissible if the intercepted network address is not indicated in the cache,
        add the intercepted network address to the cache and permit the intercepted network address to pass if the monitoring server indicates that the content at the intercepted network address is permissible, and
        block the intercepted network address from being passed to the transport layer process if the monitoring server indicates that the content at the intercepted network address is not permissible.

7. The computer-readable media of claim 6, wherein the socket services code includes a hook to call the intervening control layer code.

8. The computer-readable media of claim 7, wherein the intervening control layer code comprises an internal process code executable to call the socket services code to contact the monitoring server with a bypass of the hook.

9. A computer system comprising:
    a processor;
    a network interface; and
    a computer-readable medium having stored therein,
        a socket services code executable to receive a network address from an application and to pass the network address to a transport layer process; and
        an intervening control layer code executable to,
            intercept a network address to be passed by the socket services code to a transport layer process,
            check a cache of addresses and to permit the intercepted network address to pass to the transport layer process if indicated in the cache and to block the intercepted network address from being passed to the transport layer process if not indicated in the cache,
            ask a monitoring server if content at the intercepted network address is permissible if the intercepted network address is not indicated in the cache,
            add the intercepted network address to the cache and permit the intercepted network address to pass if the monitoring server indicates that the content at the intercepted network address is permissible, and
            block the intercepted network address from being passed to the transport layer process if the monitoring server indicates that the content at the intercepted network address is not permissible.

10. The computer system of claim 9, wherein the socket services code includes a hook to call the intervening control layer code.

11. The computer system of claim 10, wherein the intervening control layer code comprises an internal process code executable to call the socket services code to contact the monitoring server with a bypass of the hook.

* * * * *